(12) United States Patent
Schroeder

(10) Patent No.: US 8,961,057 B2
(45) Date of Patent: Feb. 24, 2015

(54) FOLD LATCH AND FOLD JOINT FOR A STROLLER

(71) Applicant: Graco Children's Products Inc., Atlanta, GA (US)

(72) Inventor: Brady Matthew Schroeder, Milton, GA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/717,224

(22) Filed: Dec. 17, 2012

(65) Prior Publication Data
US 2013/0156490 A1  Jun. 20, 2013

Related U.S. Application Data

(60) Provisional application No. 61/577,087, filed on Dec. 18, 2011.

(51) Int. Cl.
*F16C 11/00* (2006.01)
*F16C 11/10* (2006.01)
*B62B 7/08* (2006.01)

(52) U.S. Cl.
CPC . *F16C 11/10* (2013.01); *B62B 7/08* (2013.01); *F16C 2326/20* (2013.01)
USPC .......................................... 403/102; 280/647

(58) Field of Classification Search
USPC ........... 403/81, 84, 91, 98, 102, 322.1, 322.3; 280/647, 648, 650
See application file for complete search history.

(56) References Cited

U.S. PATENT DOCUMENTS

| 5,190,390 A | 3/1993 | Ming-Tai |
| 5,240,265 A | 8/1993 | Huang |
| 5,388,853 A | 2/1995 | Lauro |
| 5,513,864 A | 5/1996 | Huang |
| 5,553,885 A | 9/1996 | Chang |
| 5,605,409 A | 2/1997 | Haut et al. |
| 5,634,654 A | 6/1997 | Lin |
| 5,755,455 A | 5/1998 | Chen et al. |
| 5,765,958 A | 6/1998 | Lan |
| 5,794,951 A | 8/1998 | Corley et al. |

(Continued)

FOREIGN PATENT DOCUMENTS

| EP | 0885797 A1 | 12/1998 |
| EP | 1614605 A1 | 1/2006 |

(Continued)

*Primary Examiner* — Michael P Ferguson
*Assistant Examiner* — Daniel Wiley
(74) *Attorney, Agent, or Firm* — Lempia Summerfield Katz LLC

(57) ABSTRACT

A fold joint for a stroller has a first latch part fixed to a first frame element and a second latch part fixed to a second frame element. The latch parts are pivotable relative to one another about a pivot axis between an in-use orientation and a folded orientation. A latch shuttle is movable between a latched position locking the latch parts in the in-use orientation and an unlatched position unlocking the latch parts. A latch pin is carried by the latch shuttle. A track on the first latch part has a fold portion and a latch portion. A slot on the second latch part aligns with the latch portion in the in-use orientation. The latch pin is captured within the track and slot. When the latch shuttle is moved to the unlatched position, the latch pin is moved along the latch portion to the fold portion of the track. When the latch parts are pivoted toward the folded orientation, the latch pin moves along the fold portion of the track.

5 Claims, 8 Drawing Sheets

(56) References Cited

U.S. PATENT DOCUMENTS

| | | |
|---|---|---|
| 5,845,924 A | 12/1998 | Huang |
| 5,865,460 A | 2/1999 | Huang |
| 5,871,227 A | 2/1999 | Huang |
| 6,062,587 A * | 5/2000 | Cabagnero .................... 280/642 |
| 6,062,588 A | 5/2000 | Cheng |
| 6,095,548 A | 8/2000 | Baechler |
| 6,099,019 A | 8/2000 | Cheng |
| 6,105,998 A | 8/2000 | Baechler et al. |
| 6,152,477 A | 11/2000 | Hsin et al. |
| 6,174,028 B1 * | 1/2001 | Yang et al. ................. 297/258.1 |
| 6,196,571 B1 | 3/2001 | Chen et al. |
| 6,238,125 B1 | 5/2001 | Lin |
| 6,302,613 B1 | 10/2001 | Lan |
| 6,378,892 B1 | 4/2002 | Hsia |
| 6,409,205 B1 | 6/2002 | Bapst et al. |
| 6,416,077 B1 | 7/2002 | Chen et al. |
| 6,422,586 B1 | 7/2002 | Glover |
| 6,494,479 B1 | 12/2002 | Cheng |
| 6,523,853 B1 | 2/2003 | Cheng |
| 6,594,840 B2 | 7/2003 | Tomas et al. |
| 6,682,090 B2 | 1/2004 | Chen |
| 6,886,851 B2 | 5/2005 | Chen |
| 6,896,286 B2 | 5/2005 | Lin |
| 6,908,101 B2 | 6/2005 | Chen |
| 6,910,708 B2 | 6/2005 | Sack et al. |
| 7,281,732 B2 | 10/2007 | Fox et al. |
| 7,441,794 B2 * | 10/2008 | Lan ............................. 280/642 |
| 7,543,840 B2 | 6/2009 | Lin |
| 7,614,641 B2 * | 11/2009 | Hartenstine et al. .......... 280/642 |
| 7,632,035 B2 | 12/2009 | Cheng |
| 7,766,366 B2 | 8/2010 | Li |
| 7,780,183 B2 * | 8/2010 | Chen et al. .................... 280/647 |
| 8,226,110 B2 | 7/2012 | Liao |
| 8,342,563 B2 | 1/2013 | Lin |
| 8,444,170 B2 | 5/2013 | Chen et al. |
| 8,448,977 B2 | 5/2013 | Grintz et al. |
| 8,480,116 B2 | 7/2013 | Li |
| 8,485,547 B2 | 7/2013 | Hsu |
| 2002/0041082 A1 * | 4/2002 | Perego ........................... 280/647 |
| 2004/0071499 A1 * | 4/2004 | Chen ............................. 403/102 |
| 2008/0211206 A1 | 9/2008 | Thorne et al. |
| 2009/0058026 A1 | 3/2009 | Park et al. |
| 2010/0127480 A1 * | 5/2010 | Ahnert et al. ................. 280/647 |
| 2010/0201103 A1 | 8/2010 | Kretschmer et al. |
| 2010/0230933 A1 * | 9/2010 | Dean et al. .................... 280/647 |
| 2011/0148076 A1 * | 6/2011 | Chen ............................. 280/650 |
| 2011/0181024 A1 * | 7/2011 | Chicca ........................... 280/642 |
| 2011/0291389 A1 | 12/2011 | Offord |

FOREIGN PATENT DOCUMENTS

| | | |
|---|---|---|
| EP | 1783028 A1 | 5/2007 |
| EP | 1842760 A2 | 10/2007 |
| EP | 1847439 A1 | 10/2007 |
| EP | 1889772 A2 | 2/2008 |
| EP | 1916173 A2 | 4/2008 |
| EP | 1967439 A2 | 9/2008 |

* cited by examiner

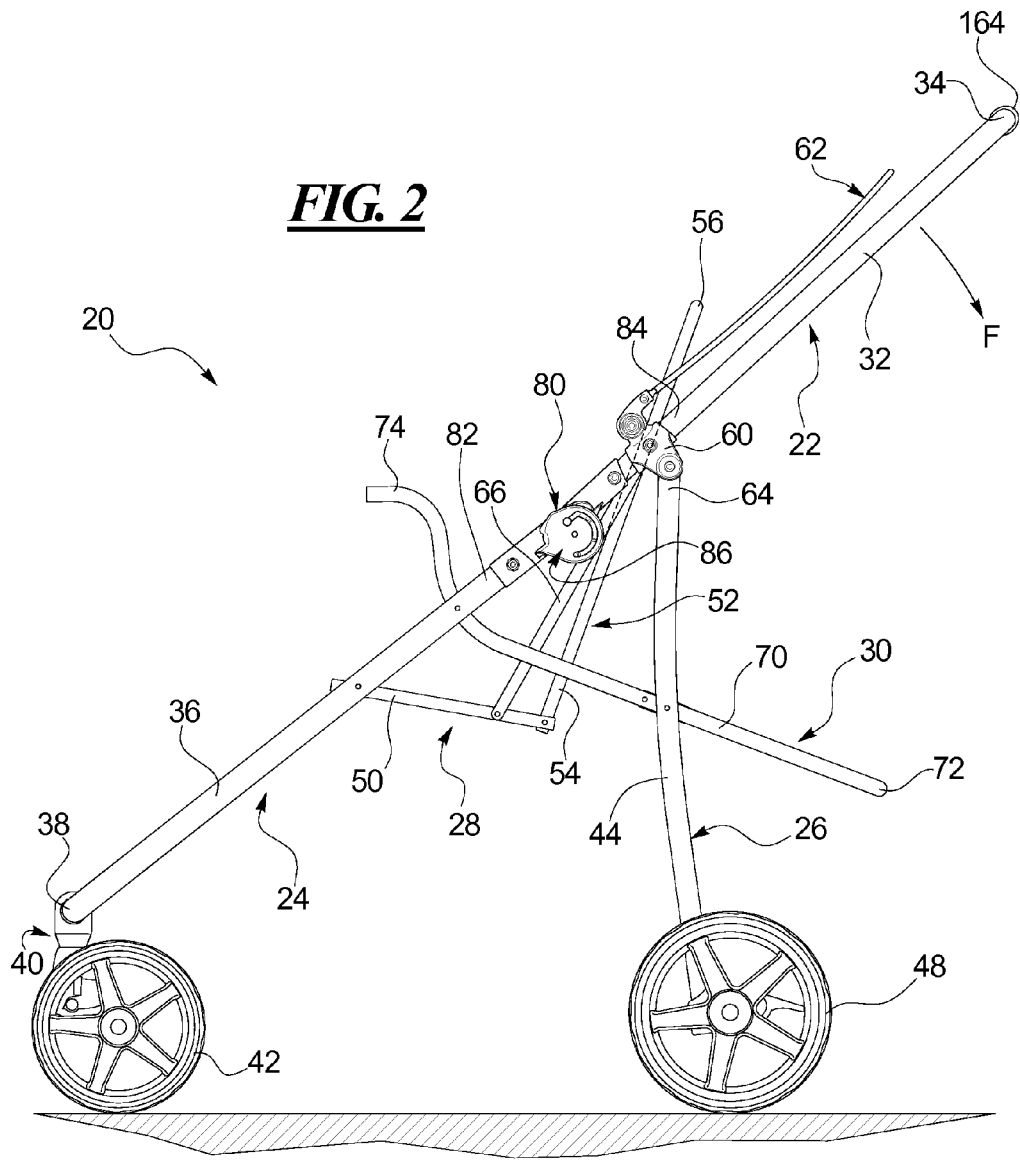

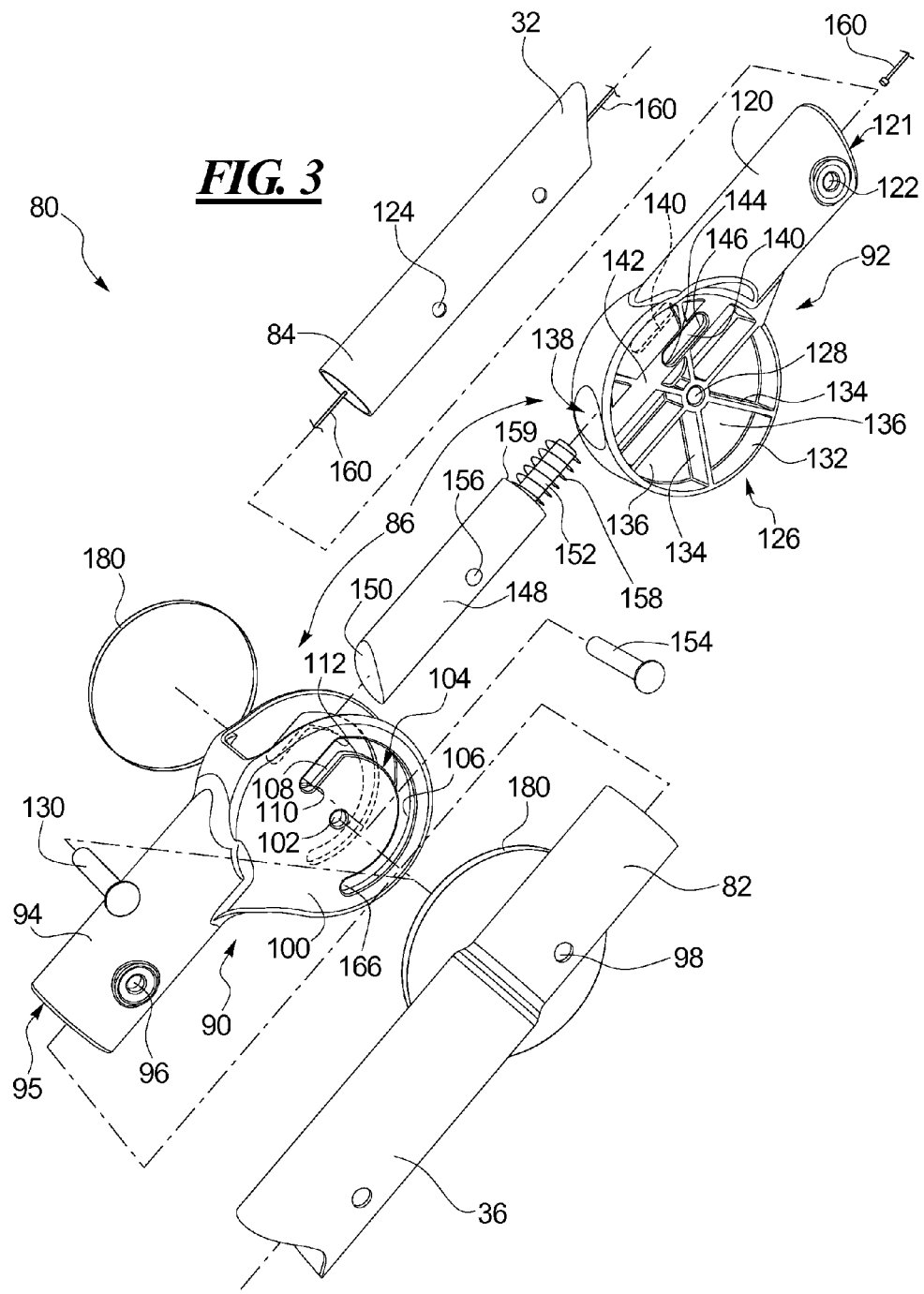

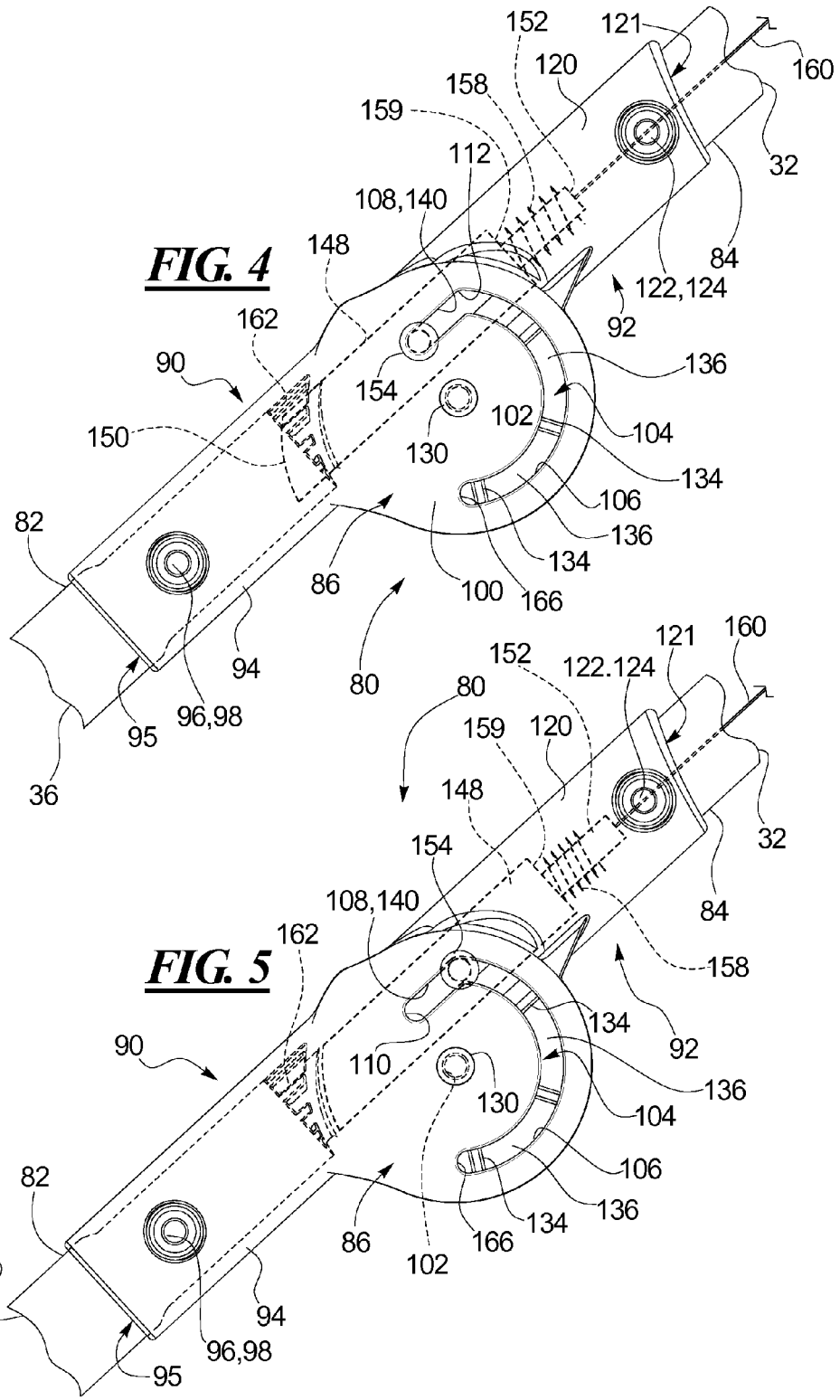

FOLD LATCH AND FOLD JOINT FOR A STROLLER

RELATED APPLICATION DATA

This patent is related to and claims priority benefit of U.S. provisional application Ser. No. 61/577,087 filed on Dec. 18, 2011 and entitled "Safe Latch and Fold Joint for Stroller." The entire content of this prior filed application is hereby incorporated herein by reference.

BACKGROUND

1. Field of the Disclosure

The present disclosure is generally directed to foldable strollers, and more particularly to a fold latch and fold joint for a stroller that minimizes pinch points at the frame fold joint.

2. Description of Related Art

Strollers for transporting toddlers and infants are well known. Nearly all strollers available today are foldable and unfoldable between a folded configuration for ready storage and transport and an in-use configuration for pushing a child. Such strollers typically have a frame construction with a plurality of frame components, i.e., tubes, bars, legs handles, cross-braces, or the like, that pivot relative to one another as the frame is being folded or unfolded. Thus, nearly every stroller on the market has some type of fold joint, which allows the frame components to pivot relative to one another during folding and unfolding. Also, nearly every stroller of this type has a fold latch typically associated with at least one, if not each, of the fold joints. The fold latch is typically constructed to retain the stroller frame in the in-use configuration so that the stroller does not unintentionally fold, but instead only when intended and after the fold latches are released or unlatched.

Pinch, shear, and entrapment issues have been a problem with fold latches and fold joints on these types of strollers since inception. Components of the fold latch, fold joint, or both are typically exposed at least at some point during folding or unfolding and/or when the fold latch or latches are engaged or latched and/or when unlatched or released. In addition, pinch points are sometimes created between closely adjacent frame components and typically, though not always, when the stroller frame is moved to the folded configuration. The hands or fingers of caregivers and children can sometimes suffer injury if pinched or caught between various fold latch, fold joint, and/or frame components of such strollers during folding and unfolding.

Others have tried to solve or improve upon stroller fold latch and fold joint structures and configurations in order to reduce or minimize the pinch, shear, and entrapment issues and problems associated therewith. Others have addressed and alleviated these problems with only moderate degrees of success. However, these known solutions are either typically not very robust, are relatively large and bulky, and/or do not satisfactorily eliminate the problems and issues.

SUMMARY

In one example according to the teachings of the present invention, a fold joint for a stroller has a first latch part fixed to a first frame element and a second latch part fixed to a second frame element. The first and second latch parts are pivotable relative to one another about a pivot axis between an in-use orientation and a folded orientation. A latch shuttle is movable between a latched position locking the first and second latch parts in the in-use orientation and an unlatched position unlocking the first and second latch parts. A latch pin is carried by the latch shuttle. A track on the first latch part has a fold portion and a latch portion. A slot on the second latch part aligns with the latch portion in the in-use orientation. The latch pin is captured within the track and the slot. When the latch shuttle is moved to the unlatched position, the latch pin is moved along the latch portion to the fold portion of the track. When the first and second latch parts pivot toward the folded orientation, the latch pin moves along the fold portion of the track.

In one example, the first frame element can be a front leg of a frame assembly of the stroller.

In one example, the second frame element can be a push arm of a handle assembly of the frame assembly.

In one example, the first latch part can have a pair of plates that are spaced apart from one another. A pivot axis can be defined through and generally perpendicular to the pair of plates. The second latch part can have a puck sandwiched between the pair of plates.

In one example, the first latch part can have two of the tracks, a pair of plates that are spaced apart from one another, and a pivot axis defined between the pair of plates. Each plate can carry one of the tracks.

In one example, the second latch part can have a puck sandwiched between a pair of plates on the first latch part. The plates and puck can be pivotable relative to one another about a pivot axis. The slot can extend through the puck between the plates.

In one example, the latch shuttle can slidably extend through and across a puck on one of the latch parts, perpendicular to and radially offset from a pivot axis of the fold joint.

In one example, the latch shuttle can extend through part of the second latch part and can be resiliently biased toward the latched position.

In one example, the first and second latch parts can be coupled to and pivotable relative to one another about a pivot axis. The fold portion can be curved and spaced at a radius from the pivot axis. The latch portion can extend from one end of the fold portion. The slot can have the same contour as the latch portion of the track.

In one example, the slot and the latch portion of the track can be linear. A portion of each can be at a different radial distance from a pivot axis of the fold joint than a radius of the fold portion from the pivot axis.

In one example, when the first and second latch parts pivot toward the folded orientation, the slot can move out of alignment with the latch portion of the track, retaining the latch shuttle in the unlatched position with the fold latch in the folded orientation.

In one example according to the teachings of the present invention, a fold joint for a stroller has a first latch part fixed to a first frame element and a second latch part fixed to a second frame element. The first and second latch parts are coupled to and pivotable relative to one another about a pivot axis between an in-use orientation and a folded orientation. A latch shuttle is movable between a latched position locking the first and second latch parts in the in-use orientation and an unlatched position permitting the first and second latch parts to pivot to the folded orientation. A latch pin is carried by and movable with the latch shuttle. A track on the first latch part has a fold portion spaced at a radius from the pivot axis and a latch portion at one end of the fold portion. A slot on the second latch part is aligned with the latch portion of the track in the in-use orientation. The latch pin extends through the track and the slot and is spaced from the fold portion of the track with the latch shuttle in the latched position. When the latch shuttle is moved to the unlatched position, the latch pin is moved along the slot and the latch portion of the track to the one end of the fold portion of the track. When the first and second latch parts are pivoted toward the folded orientation, the latch pin moves along the fold portion toward another end of the track.

In one example, the fold portion of the track can be curved and the latch portion may not be curved.

In one example, the latch shuttle can slide perpendicular to and be spaced a distance from the pivot axis.

In one example, the latch pin can be arranged parallel to and spaced from the pivot axis.

In one example, the slot can move out of alignment with the latch portion of the track when the fold joint moves from the in-use orientation toward the folded orientation.

In one example, the slot and the latch portion of the track can each generally be linear and the fold portion can be curved about the pivot axis.

In one example, the first latch part can have a pair of plates spaced apart from one another and a pivot axis defined perpendicular to and between the pair of plates. One of the tracks can be carried on each of the pair of plates. The second latch part can have a puck sandwiched between the pair of plates and can be pivotable about the pivot axis. The slot can extend through the puck between the plates.

In one example, the latch shuttle can slidably extend through part of one of the latch parts and a latching end of the latch shuttle can engage the other one of the latch part in the latched position.

In one example, the latch shuttle can extend through a portion of the second latch part, can engage the first latch part in the latched position, and can be resiliently biased toward the latched position.

In one example, the fold joint can also have a cover that encloses and hides portions of the first and second latch parts including the latch pin, the track, the slot, and the latch shuttle.

BRIEF DESCRIPTION OF THE DRAWINGS

Objects, features, and advantages of the present invention will become apparent upon reading the following description in conjunction with the drawing figures, in which:

FIG. 2 shows a side view of the stroller frame assembly shown in FIG. 1.

FIG. 3 shows an exploded perspective view of one of the fold joints of the stroller frame assembly shown in FIG. 1.

FIG. 4 shows a close-up, side view of one of the fold joints and portions of the corresponding frame components shown in FIG. 2, and in a latched position and the in-use configuration.

FIG. 5 shows the fold joint of FIG. 4, in the in-use configuration, but in an unlatched position.

DETAILED DESCRIPTION OF THE DISCLOSURE

The disclosed stroller frame assembly, fold joint, and fold latch constructions solve or improve upon one or more of the above-noted and/or other problems and disadvantages with prior know such stroller elements. In one example, the disclosed stroller frame assembly has a safe fold joint/fold latch construction that reduces or eliminates pinch points in the structure of the joint and the latch. In one example, the disclosed fold latch has latch components that are not exposed in either the latched or unlatched positions. In one example, the disclosed fold latch has latch components that are not exposed in either the folded or unfolded configurations of the stroller frame assembly. In one example, the disclosed fold joint helps to reduce pinch points on the joint and among the stroller frame components in the folded and unfolded configurations. These and other objects, features, and advantaged of the present invention will become apparent to those having ordinary skill in the art upon reading this disclosure.

Figure 1:
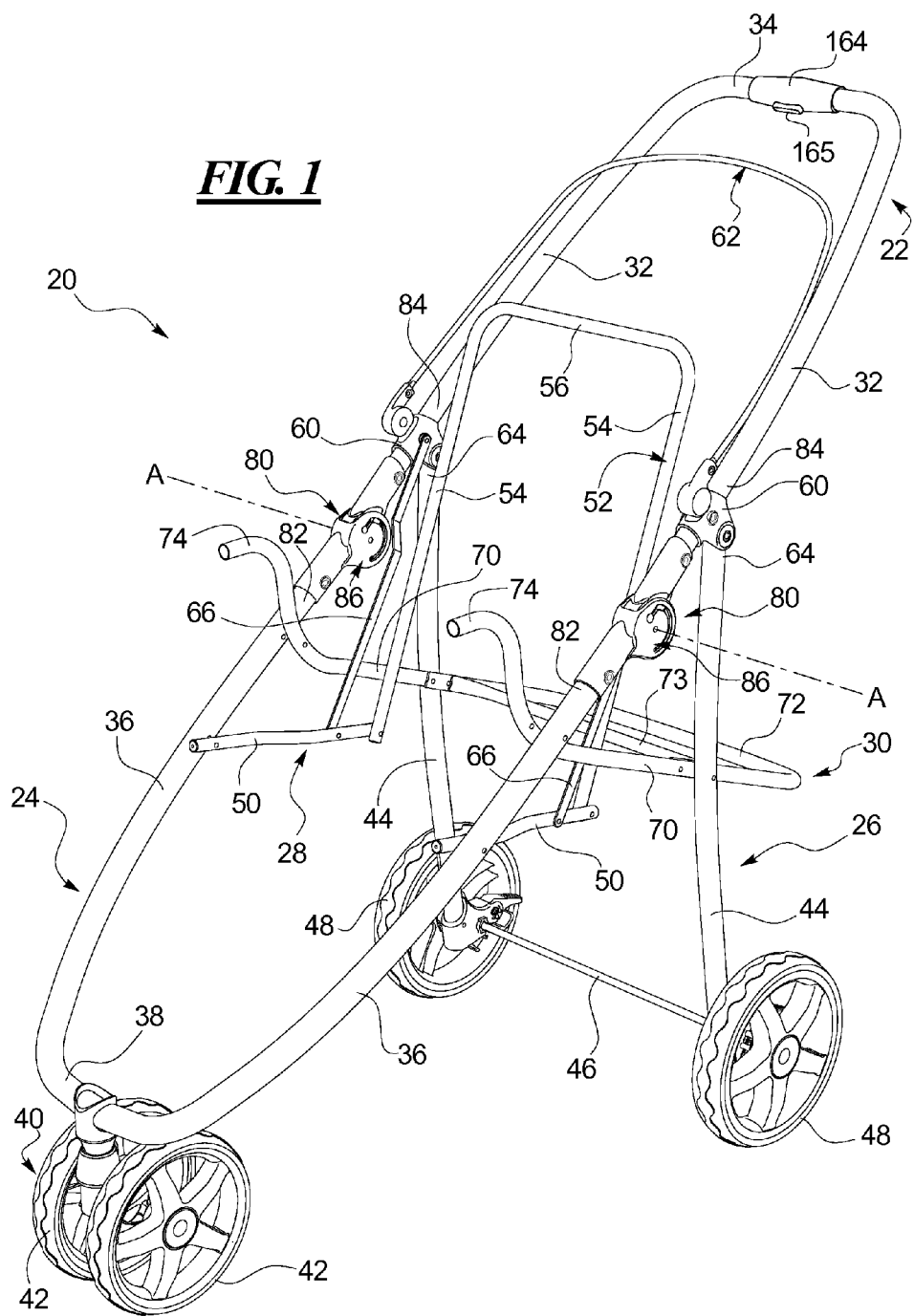
FIG. 1 shows a perspective view of one example of a stroller frame assembly, minus the typical seat fabric and soft goods, having fold joints and fold latches constructed in accordance with the teachings of the present invention, and depicted in an in-use configuration.

Turning now to the drawings, FIGS. 1 and 2 show a frame assembly 20 of a stroller constructed in accordance with the teachings of the present invention. The frame assembly 20 is shown herein without any softgoods for a seat, a canopy, or any other component, though a typical stroller would have such elements. In general, the frame assembly 20 has a number of subassemblies, each having frame elements or components, which are interconnected to form the frame assembly. These subassemblies include, for example, a handle assembly 22, a front leg assembly 24, a rear leg assembly 26, a seat frame assembly 28, and a basket frame 30. The particular structure of the frame assembly 20 can vary considerably within the spirit and scope of the present invention. In this example, the frame assembly 20 has left and right frame sides. Each side is essentially a minor image of the other. Thus, where appropriate herein, only one side or one frame element or component from that side is described, the other side having a minor image element or component thereof.

The handle assembly 22 has left and right side push arms 32 connected at their respective top ends by a handle bar 34. The handle bar 34 extends transversely or laterally across a width of the frame assembly 20. The push arms 32 extend upward and rearward, terminating at the handle bar 34. The front leg assembly 24 has left and right side front legs 36 that converge toward one another near their respective lower ends and are connected thereat by a short cross bar 38. The short cross bar 38 also extends laterally between the front legs 36 and the front legs extend forward and downward, terminating at the short cross bar 38. A single front wheel assembly 40 is mounted to the short cross bar 38 and central to the frame assembly 20. The front wheel assembly 40 in this example can swivel about a vertical axis, as is known in the art, and has dual wheels 42, as is also known in the art.

The rear leg assembly has 26 has left and right side rear legs 44. Lower ends of the rear legs 44 are connected by an axle 46 that extends laterally across a width of the frame assembly 20. A rear wheel 48 is connected at the lower end of each rear leg 44. The combination of one central front wheel assembly and two spaced apart rear wheels gives the stroller a three wheel configuration, like many jogging strollers. A majority of strollers have a more conventional four wheel construction. The disclosed invention will function equally well with either a three or four wheel stroller construction. The frame assembly 20 can be moved and rolled on the two rear wheels 48 and the dual front wheel assembly 40, as is known in the art.

The seat frame 28 in this example is configured to support fabric panels (not show) or other seat panels. The seat frame 28 has left and right side seat bottom bars 50 that are generally horizontal, parallel, and spaced apart across the width of the frame assembly 20. The bottom bars 50 extend rearward from the front legs 36 and are pivotally connected to a seat back frame 52. The seat back frame 52 is an inverted U-shape with left and right side seat back bars 54 that are generally vertically oriented. Upper ends of the back bars 54 are connected by a top bar 56 and lower ends of the back bars are pivotally connected to the rear ends of the bottom bars 50. The bottom bars 50 and seat back frame 52 would support a fabric seat bottom and seat back (not shown), respectively, creating a sling type seat for the stroller.

A connector 60 is carried on and fixed to each of the push arms 32. A canopy frame 62 is also an inverted U-shape having left and right legs 62 with lower ends that are respectively and pivotally connected to a corresponding one of the connectors 60. In this example, an upper end 64 of each of the rear legs 44 is also pivotally connected to a respective one of the connectors 60. Each frame side has a seat link 66 with an upper end connected to a respective one of the connectors 60. A lower end of each seat link 66 is connected to the corresponding bottom bar 50 of the seat assembly 28, but forward of the connection between the seat back frame 52 and bottom bars. The seat links 66 create side wings for the seat assembly 28 when the softgoods are applied, and assist in folding the seat assembly when the frame assembly 20 is folded, as described below.

The basket frame 30 is configured to support or suspend a storage basket (not shown). The storage basket can be a fabric construction, a solid wall box-like container, or the like. The basket frame 30 has left and right side supports 70 that are generally horizontally oriented, though tilted down slightly in a front to rear direction, a rear cross-member 72 extending between the rear ends of the side supports, and a mid-cross-member 73 extending between the side supports forward of the rear cross-member. The side supports 70 extend between and are pivotally coupled to both the front legs 36 and the rear legs 44. Portions of the side supports 70 and the rear cross-member 72 are positioned rearward of the rear legs 44, whereas the mid-cross-member 73 is positioned generally I line with the rear legs. The basket frame 30 adds structural integrity and strength to the frame assembly, particularly across a width of the stroller. Portions of the side supports 70 also protrude forward of the front legs 36. These portions create armrests 74 on each side of the seat assembly 28 for the seat occupant. The armrests 74 can be covered by fabric, plastic, rubber, or the like to create a desired look and a comfortable resting surface for the child seat occupant.

With reference to FIG. 2, the disclosed frame assembly 20 is generally in the form of an A-frame configuration when viewed from the side. Thus, each frame side generally takes the form of the capital letter A. However, as will become apparent to those having ordinary skill in the art upon reading this disclosure, the shape and configuration of the frame assembly 20 for a stroller utilizing features of the present invention can vary in configuration and construction from the example shown and described herein.

The disclosed frame assembly 20 is foldable as described below. The various subassemblies on each side of the frame assembly 20 are connected directly or indirectly to a respective left or right side fold joint 80. In general, an upper end 82 of each front leg 36 is joined to a corresponding one of the fold joints 80 Likewise, a lower end 84 of each push arm 32 extends below the corresponding fixed connector 60 is also joined to a corresponding one of the fold joints 80. The various other subassemblies of the frame assembly 20 are indirectly connected to the fold joints 80 through their connection to one or more of the front legs 36 or the push arms 32.

FIG. 3 shows an exploded view of one of the fold joints 80, including the upper end 82 of one of the front legs 36 and the lower end 84 of one of the push arms 32 to which the fold joint 80 is attached. FIG. 4 shows an assembled close up view of the fold joint 80 depicted in FIGS. 2 and 3. As used herein, the term "fold joint" refers to the joint structure pivotally connecting components of the frame assembly 20 to permit folding and unfolding of the frame assembly. As used herein, the term "fold latch" refers to the components creating a locking or latching function at or within the fold joint 80 to allow or prevent pivoting movement of the components joined at the fold joint. However, these terms may be used interchangeably herein to refer generally to the structure connecting frame components of the frame assembly 20 at the fold or pivot axis A.

The fold joint 80 in the disclosed example generally has a central hub 86 that defines the pivot axis A about which components of the fold joint 80 can pivot relative to one another during folding and unfolding of the frame assembly 20. The fold joint 80 has a first latch part 90 that defines a portion of the hub 86 and a second latch part 92 that defines another portion of the hub when the two latch parts are assembled to one another. As used herein, the terms "first" and "second" are used for convenience of description only. The first and second latch parts 90 and 92 can be inverted from the example disclosed and described herein, as can the various features and characteristics of each latch part, while still functioning as intended.

With specific reference to FIG. 3, the first latch part 90 in this example is a lower latch part connected to the upper end 82 of the front leg 36. The first latch part 90 has a tubular portion forming a hosel 94. The hosel 94 has an open end 95 with a shape and size configured to slip over the upper end 82 of the front leg 36. Corresponding holes 96 and 98 are provided, respectively, in the hosel 94 and the upper end 82 and can receive screws, rivets, or other fasteners (not shown) to secure the first latch part 90 to the front leg 36. In this example, the hosel 94 is configured to fit over the upper end 82 of the front leg 36, although this characteristic can also be reversed, if desired. The first latch part 90 also has a hub portion defined or created by a pair of plates 100 or discs that extend from an end of the hosel 94 opposite the open end 95 in a lengthwise direction relative to the hosel. The plates 100 are spaced apart from one another creating a gap therebetween. In this example, the plates 100, other than the portions connected to the hosel 94, have a generally circular perimeter edge when viewed from a side of the first latch part 90. A central opening 102 is formed through the center of each of the plates 100. These openings 102 are aligned with one another across a width of the first latch part 90 and each, in part, defines the pivot axis A of the fold joint 80. The pivot axis A is generally perpendicular to the plates 100 and extends in a direction between the plates 100.

In the disclosed example, a track 104 is formed through each of the plates 100. The tracks 104 are mirror images of one another and are aligned across the first latch part 90. The track in each plate has a fold portion 106 and a latch portion 108. The latch portion 108 is connected to and is open to, i.e., common with, one end of the fold portion 106. The latch portion 108 has a closed end 110 that lies closer to the pivot axis A than its opposite end, i.e., a common end 112, which is the end common with and connected to the fold portion 106 of the track 104. The latch portion 108 in this example is also generally linear or straight. In contrast, the fold portion 106 is curved and lies at a constant radius and spaced radially outward from the pivot axis A.

As will become evident to those having ordinary skill in the art, the first latch part 90 can be a unitary, integral molded component including the hosel 94 and the plates 100. In an alternative example, the hosel and the plates can be separately formed and connected to one another, if desired. The first latch part 90 can also be formed having a single track 104 instead of having one track in each of a pair of plates. Likewise, the one or more tracks can be formed as blind recesses in one or more surfaces of the first latch part 90, instead of being formed as passing through the plates. Further, the plates can be replaced by other suitable components or elements that can be utilized to form part of the pivot hub for the fold joint 80. For example, the first latch part may carry just one of the plates having a surface that carries a single track thereon. In such an example, that surface can be configured to mate against a surface on the second latch part. In another example, the plates need not be plate shaped, but instead can be virtually any shape as long as one surface of the element is configured to permit a mating element to pivot relative thereto about the pivot axis A. Still further, the first latch part 90 can be formed from molded plastic, aluminum, or other suitable materials.

In the disclosed example, the second latch part 92 is an upper latch part connected to the lower end 84 of the push arm 32. The second latch part 92 also has a tubular portion forming a hosel 120. The hosel 120 has an open end 121 with a shape and size configured to receive the lower end 84 of the push arm 32 therein. Corresponding holes 122 and 124 are provided, respectively, in the hosel 120 and the lower end 84 can receive screws, rivets, or other fasteners (not shown) to secure the second latch part 92 to the push arm 32. In this example, the hosel 120 is configured to fit over the lower end 84 of the push arm 32, although this characteristic can also be reversed, if desired. The second latch part 92 also has a hub portion defined or created by a puck 126 that extends from an end of the hosel 120 opposite the open end 121 and in a lengthwise direction relative to the hosel. The puck 126 is generally of a thickness sized to fit within the gap between the plates 100 on the first latch part 90. In this example, the puck 126, other than the portion connected to the hosel 120, has a generally circular perimeter edge when viewed from a side of the second latch part 92. A central opening 128 is formed through the center of the puck 126. The opening 128 is aligned with the plate openings 102 across a width of the second latch part 92 and, in part, defines the pivot axis A of the fold joint 80. A pivot pin 130 can be received through the hub 86 of the fold joint 80, and thus through the opening 128 in the puck 126 and the openings 102 in the plates 100. The pivot pin 130 can define the pivot axis A, about which the first and second latch parts 90 and 92 can pivot relative to one another.

The second latch part 92 in this example is configured to reduce material consumption required for fabricating the part. Thus, the puck 126 has a rim portion 132 and a plurality of spokes 134 extending from the opening 128 radially outward to the rim portion. The width of the rim portion 132 and the spokes 134 across a width of the puck 126 is sized to fit within the gap between the plates 100. A large percentage of the remaining portions of the puck 126, i.e., thin walled portions 136 between the rim portion 132 and spokes 134, can have a much reduced wall thickness. The rim portion 132 and spokes 134 provide structural rigidity to the puck 126. The thin walled portions 136 allow for significant material reduction.

However, a latch bore 138 is molded into the puck component across the puck 126. The latch bore 138 is above a center line of the puck, i.e., offset from the location of the opening 128. The latch bore 138 is a through-bore across the puck 126 and has one end opening into the hosel 120 and an opposite end open through the rim portion 132.

A slot 140 is formed in each opposing wall 142 of the latch bore 138 across a width of the latch bore. Each slot 140 is positioned having one closed proximal end 144 spaced more closely to the opening 128 then an opposite closed distal end 146. A latch shuttle 148 is received within the hosel 120 and the latch bore 138 and has a latching end 150 and a cable end 152. The latch shuttle 148 in this example is an elongate, somewhat cylindrical element, with the cable end being smaller in diameter than the primary body of the shuttle. The cable end 152 coincides with the hosel end of the latch bore 138. A latch pin 154 or rivet is received through a transverse hole 156 in and affixed to the latch shuttle 148 and is also through each of the slots 140 and the tracks 104. Thus, the latch pin 154 is captured within the slots 140 and allows the latch shuttle 148 to travel along the latch bore 138 a distance defined by the length of the slots. A spring 158 or other biasing element is provided to bias the latch shuttle 148 toward the first latch part 90 for the reasons described below. In this example, the spring 158 is sized to seat over the smaller diameter cable end 152 of the latch shuttle 148. One end of the spring 158 can bear against a surface or shoulder 159 formed at the cable end 152 on the latch shuttle 148. The other end of the spring can abut against a spring stop (not shown) created within the hosel 120 or within the lower end 84 of the push arm 32. An actuator cable 160 is connected to the cable end 152 of the latch shuttle 148 and can be connected in any known or otherwise suitable manner.

As will become evident to those having ordinary skill in the art, the second latch part 92 can also be a unitary, integral molded component including the hosel and the puck. In an alternative example, the hosel and the puck can be separately formed and connected to one another, if desired. The second latch part 92 can also be formed having a single slot 140 in one wall or surface of the component, instead of two slots across an open latch bore, as in the disclosed example. Likewise, the one or more slots can be formed as blind recesses in one or more surfaces of the second latch part 92, instead of being formed as passing through the puck. Additionally, the latch pin can be replaced by a single boss formed integrally on or attached to the latch shuttle (if the first latch part has only one track) or can have a pair of such bosses protruding from opposite sides of the latch shuttle body. Further, the puck can be replaced by other suitable components or elements that can be utilized to form part of the pivot hub for the fold joint 80. For example, the second latch part may carry a mating plate, identical or similar to a single plate on the first latch part and having a surface that carries a single slot thereon. In such an example, that surface can be configured to mate against a surface on the first latch part. In another example, the puck need not be puck shaped, but instead can be virtually any shape as long as one surface of the element is configured to permit a mating element to pivot relative thereto about the pivot axis A. Further, the second latch part 92 can also be formed from molded plastic, aluminum, or other suitable materials.

In the disclosed example, and with reference to FIG. 4, the end of the hosel 94 of the first latch part 90 (opposite the open end 95) that is adjacent the plates 100 defines a latch receptacle 162. The latching end 150 of the latch shuttle 148 is configured to seat in the latch receptacle 162 when the frame assembly 20 is in the in-use configuration depicted in FIGS. 1 and 2. The latch shuttle 148, actuator cable 160, latch bore 138, and latch receptacle 162 form part of the fold latch aspect of the fold joint 80 disclosed and described herein. The slots 140, latch pin 154, and latch portions 108 of the tracks 104 also form part of the fold latch aspect of the fold joint 80.

As noted above, the frame assembly 20 can be folded and unfolded between the in-use configuration of FIGS. 1 and 2 and a folded configuration. The fold latch aspect of the fold joint 80 can also be manipulated between a latched position and an unlatched position. In the latched position as depicted in FIG. 4, the fold joint 80 prevents the frame assembly 20 from being folded by locking the fold joint 80 in an in-use orientation. The fold joint 80 is also shown in FIG. 4 in the latched position. In the in-use configuration with the fold joint 80 in the respective in-use orientation and latched position, the slots 140 are aligned with the latch portions 108 of the respective tracks 104. The latch pin 154 is free to travel along the slots 140 and latch portions 108 of the tracks 104, but is biased toward the closed proximal ends 144 of the slots and the closed ends 110 of the latch portions of the tracks.

As shown in FIGS. 1 and 2, a fold actuator 164 can be provided on a portion of the frame assembly 20, such as in a central location on the handle bar 34 as is known in the art. The actuator cables 160 can be routed from the fold actuator 164 through the respective push arms 32 to a corresponding one of the latch shuttles 148 at each fold joint 80. When a user or caregiver wishes to fold the frame assembly 20, they can actuate the fold actuator 164, such as by squeezing a button 165 on the fold actuator into the handle bar 34. Referring to the fold joint 80 of FIG. 4, this in turn will pull on the actuator cable 160 and withdraw the corresponding latch shuttle 148 in the direction of the arrow R as shown in FIG. 5 against the bias of the spring 158. This withdraws the latching end 150 of the latch shuttle 148 from the respective latch receptacle 162 in the first latch part 90. As shown in FIGS. 4 and 5, when the latch shuttle 148 is withdrawn, the latch pin 154 slides from the proximal ends 144 to the distal ends 146 of the slots 140, and simultaneously from the closed ends 110 of the latch portions 108 to the common ends 112.

With the fold latch and fold joint 80 in this condition, the latch pin 154 is now aligned with the fold portions 106 of the tracks 104 in the fold joint. Prior to this, the latch pins would be captured within the slots 140 and latch portions 108 of the tracks 104 and prevent the first and second latch parts 90 and 92 from pivoting relative to one another. Likewise, the latching end 150 of the latch shuttle 148 would be captured in the respective latch receptacle 162 in the first latch part 90, also preventing the first and second latch parts 90 and 92 from pivoting relative to one another. With the latch pin 154 and latch shuttle 148 in the unlatched or released position of FIG. 5, the fold latch is now in an unlatched or released condition. The user or caregiver is now free to fold the frame assembly 20.

Figure 6:
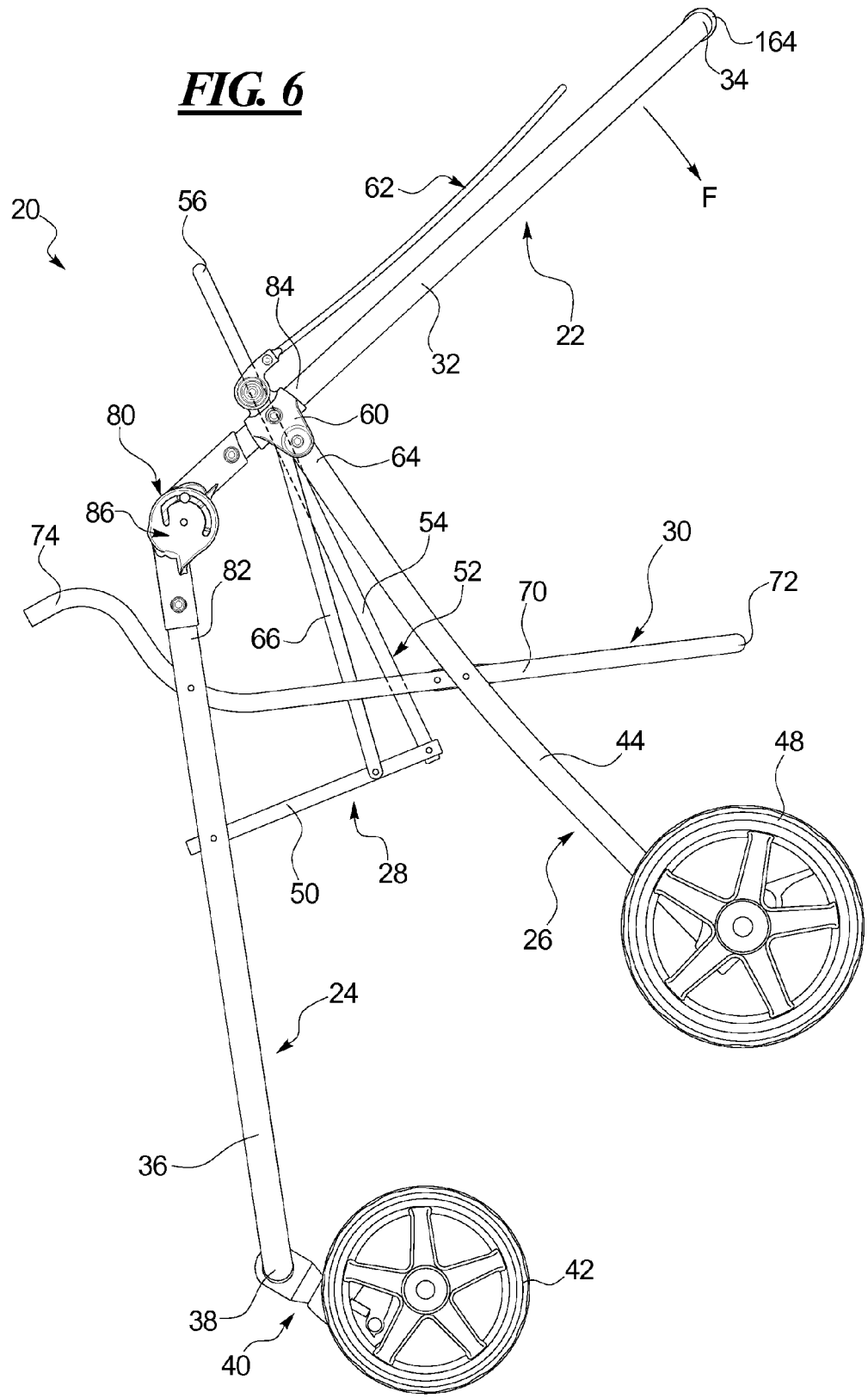
FIG. 6 shows the stroller frame assembly of FIG. 2, but in a partly folded configuration.
Figure 7:
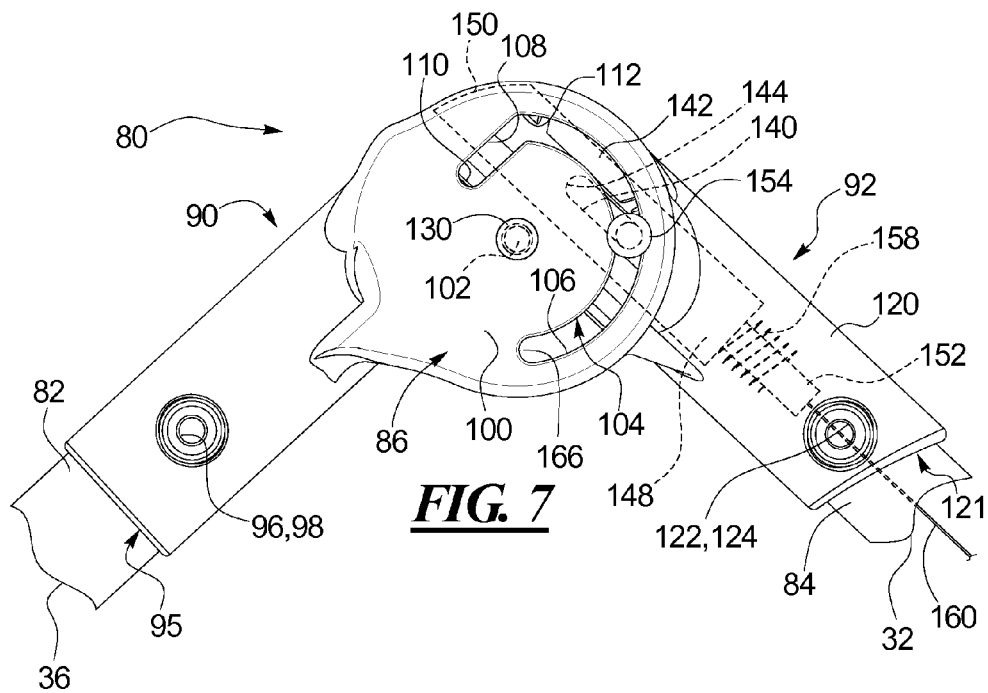
FIG. 7 shows the fold joint of FIG. 5, but in the partly folded configuration of FIG. 6.

In order to fold the frame assembly 20 in this example, the user can begin to rotate the handle assembly 22 rearward and downward in the direction of the arrow F as shown in FIGS. 2 and 6. The push arms 32 will pivot relative to the front legs 36 and, likewise, the second latch parts 92 will pivot relative to the first latch parts 90 about the pivot axis A. FIG. 7 shows the fold joint 80 in the partly folded orientation that coincides with the partly folded configuration of the frame assembly 20 in FIG. 6. As depicted therein, the latch pin 154 slides along the fold portions 106 of the tracks 104. This moves the slots 140 in the latch shuttle 138 out of alignment with the latch portions 108 of the tracks 104. Thus, in this example, as the frame assembly 20 is folded, the latch shuttle 138 will be retained in the unlatched position because the latch pin 154 is captured within the fold portions 106 and prevented from returning along the slots 140 to the closed proximal ends 144.

Figure 9:
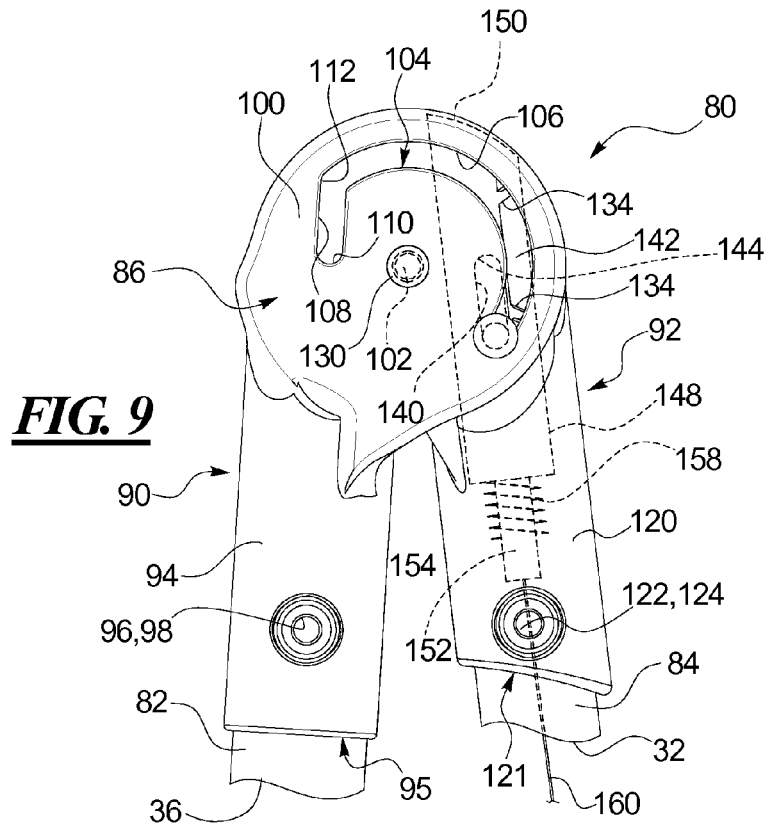
FIG. 9 shows the fold joint of FIG. 7, but in the completely folded configuration of FIG. 8.
Figure 8:
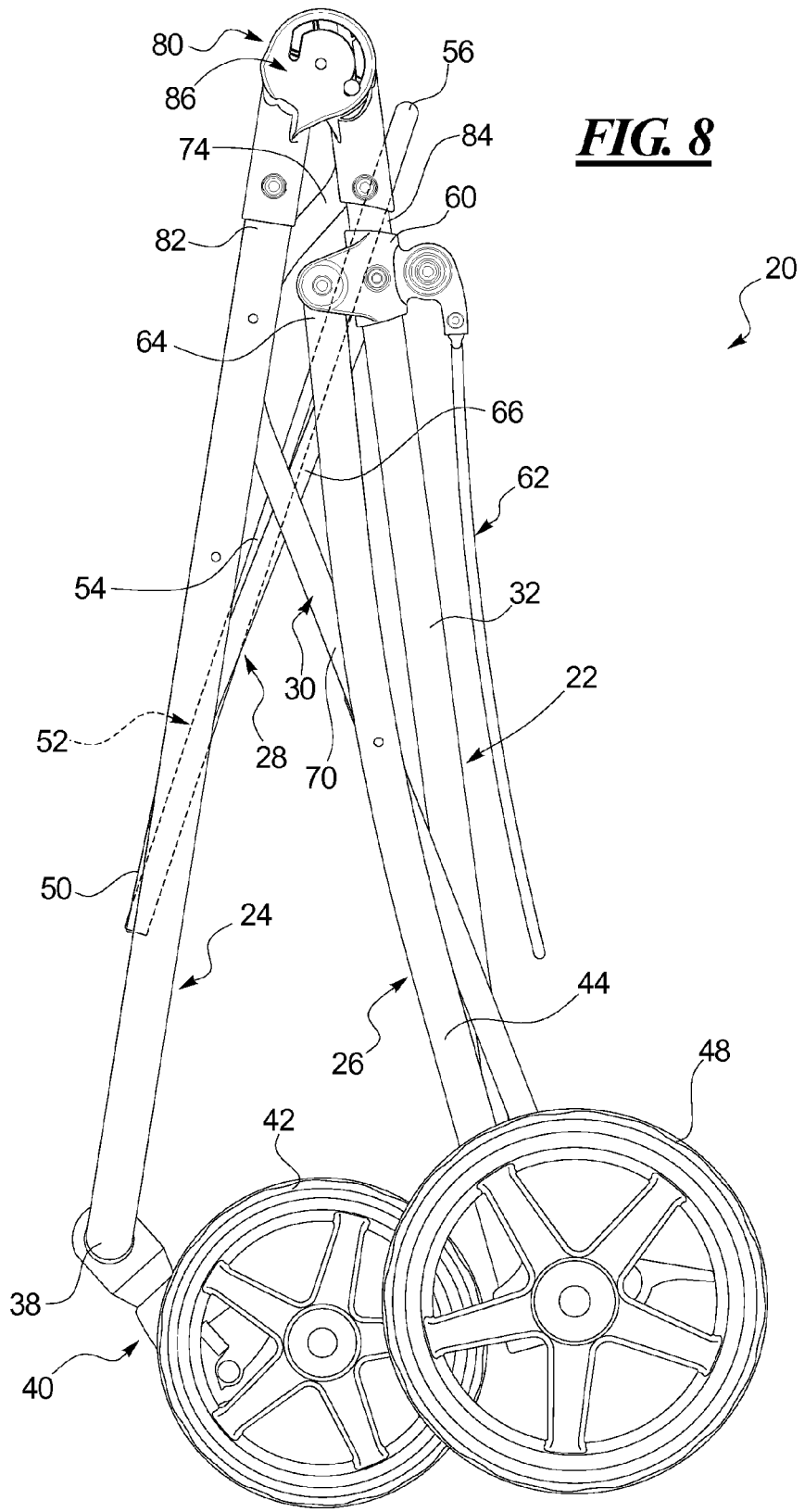
FIG. 8 shows the stroller frame assembly of FIG. 6, but in a completely folded configuration.

As shown in FIG. 8, the user or caregiver can continue to push the handle assembly 22 downward in the direction of the arrow F, further pivoting about the pivot axis A relative to the front legs 36. The user can do so in this example until the latch pin 154 reaches the extreme ends 166 of the fold portions 106 in the tracks 104. This completely folded orientation of the fold joint 80 is depicted in FIG. 9. The completely folded frame assembly shown in FIG. 8. The handle assembly 22 can be pivoted downward and then back toward the front legs 36 to the completely folded configuration. In this configuration and in this example, the rear legs 44 are sandwiched between the push arms 32 and front legs 36. The various pivoting connections between the front legs 36, rear legs 44, basket frame 30, seat bottom and back bars 50 and 54, and seat link 66, as well as the location of the pivot points created by the fixed connectors 60, drive the remaining frame components of the frame assembly 20 to the completely folded configuration of FIG. 8. When the user wishes to unfold the frame assembly 20 to the in-use configuration, the user in this example need only pull rearward and lift upward on the handle assembly 22 in the direction of the arrow U in FIG. 8, pivoting the handle assembly about the pivot axis A at the pivot joints 80 relative to the front legs 36. The remaining components will be driven by the various connections to the unfolded and in-use configuration. When the frame assembly 20 reaches the in-use configuration, the springs 158 will fire the latch shuttles 148 back into the latch receptacles 162 of the first latch parts 90 when aligned with one another in the direction of the arrow L in FIG. 4.

The above-described fold joint 80 provides a substantially self contained fold latch construction. The only exposed latch component, the latching end 150 of the latch shuttle 148, is exposed only when the fold latch is unlatched. In the disclosed example, the configuration of the tracks 104 and slots 140 are such that the latch shuttle 148 is retained in the withdrawn or unlatched position during folding of the frame assembly 20. As shown in FIGS. 7 and 9, the latching end 150 is essentially flush with the open end of the latch bore 138 blocking finger access into the latch bore and eliminating any protruding portion of the latching end 148. The latch shuttle 148 will remain in this withdrawn condition during folding and unfolding. A barrier wall 168 (see FIG. 3) on the first latch part 90 will cover the exposed end of the latch shuttle 148 before the latch shuttle is fired by the spring 158 to the latched position and into the latching receptacle 162. Prior to this, the misalignment between the slots 140 and the latch portions 108 of the tracks 104 maintains the latch shuttle 148 in the withdrawn or unlatched position.

Figure 10:
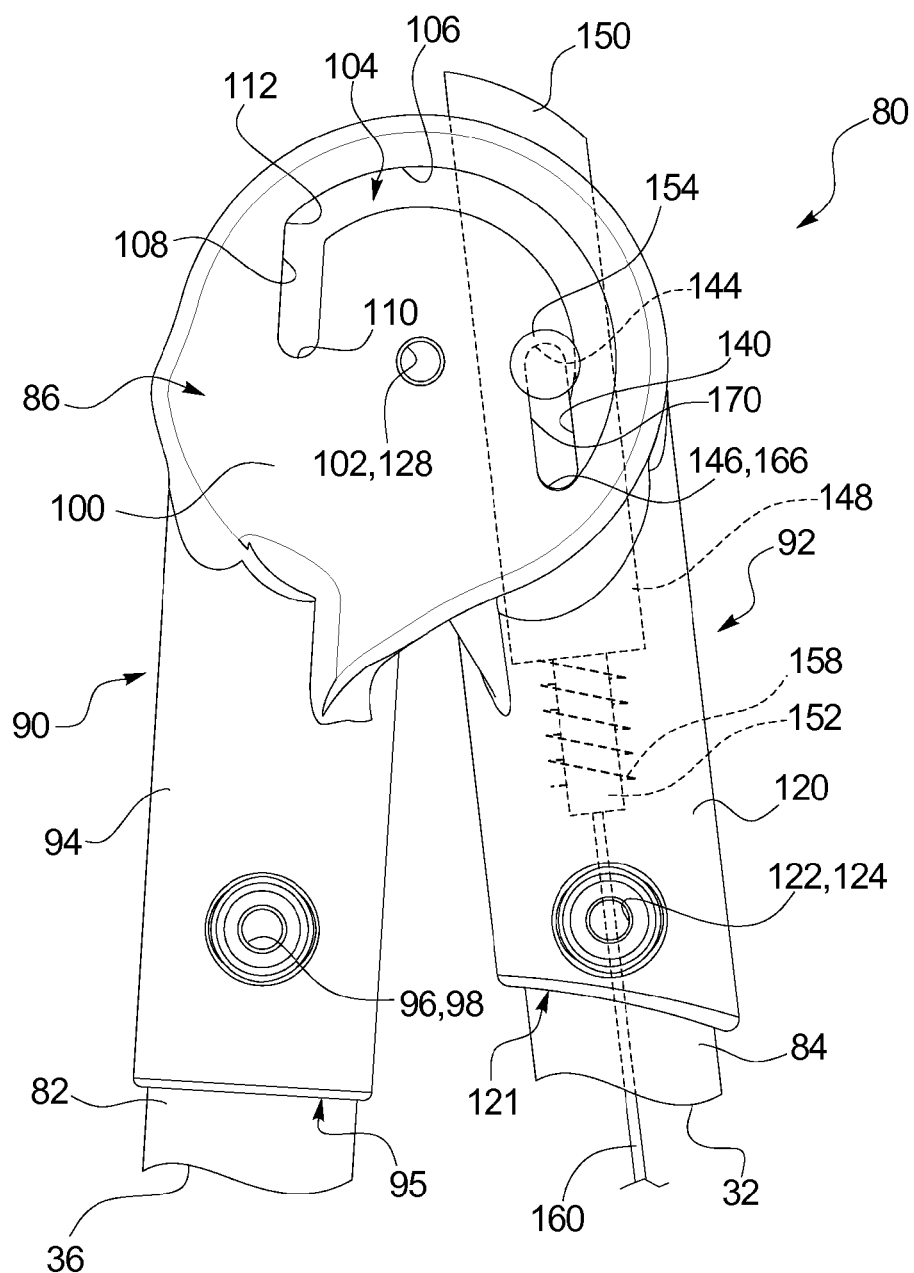
FIG. 10 shows a close-up side view of another example of a fold joint constructed in accordance with the teachings of the present invention, and in the completely folded configuration of FIG. 9.

In the disclosed example, there is no additional storage latch that will retain the frame assembly 20 in the folded configuration of FIG. 8 until released. However, FIG. 10 illustrates one alternate example of the fold joint 80, which is modified to include a storage latch feature within the same components. In this example, the fold portions 106 of the tracks 104, and particularly the extreme ends 166 of the tracks, are modified to include a triangular shaped notch or cutout 170 thereat. The notch or cutout 170 at the extreme end 166 of each track 104 is configured to overlie or realign a portion of each track 104 with the slots 140. The latch pin 154, upon reaching the folded configuration of the frame assembly 20, can be fired by the spring 158 out of the fold portion 106 of the track and into the notch or cutout 170. This allows the latch pin 154 to return to the closed proximal ends 144 in the slots 140. The shape of the notches or cutouts 170 can be such that the latch pin 154 is captured thereat, thus retaining the frame assembly 20 in the folded configuration. When the user wishes to unfold the frame assembly 20, the user can again actuate the fold actuator 164. This will move the latch pin 154 back to the distal ends 146 in the slots 140, clear the latch pin 154 from the notches or cutouts 170 and realign the latch pin with the fold portions 106 of the tracks 104. While holding the fold actuator 164, the user can then begin to unfold the handle assembly 22. Once the latch pins 154 are within the fold portions 106 of the tracks and clear of the notches or cutouts 170, the user can release the fold actuator 164 and continue to unfold the frame assembly 20 as described above.

A cover, as depicted generically in FIG. 3, can be provided to snap onto or screw onto the sides of the hub 86 and cover the tracks 104 and latch pins 154. The cover can have two sections 180, one attachable to each side of the hub 86. Each cover sections 180 can optionally have a portion (not shown) that would also cover part of the rim portion 132 of the puck 126, to further cover or hide the exposed face of the latching end 150 and the opening into the latch bore 138. In such an optional embodiment, the cover sections 180, or at least a portion thereof, might have to rotate with the hub 86, or otherwise move, to provide clearance for the hub parts (100, 126) as they rotate while still hiding the latching end 150 and opening 138 when exposed. Attaching only the disclosed cover sections 180 to the fold joint 80, the cover can hide and enclose the fold latch components, eliminating pinch and shear points on the fold latch itself. Because the latch shuttle 148 in this example is always retracted when exposed, its construction also aids in reducing or eliminating pinch or shear points. Also, as depicted in FIG. 9, the orientation and arrangement of the first and second latch parts 90, 92, and particularly the hosels 94, 120 relative to the pivot axis A, also aids in reducing or eliminating pinch or shear points in the structure. The structure results in a significant gap or spacing between the frame elements, i.e., the front leg 36 and push arm 32, in the folded orientation of the fold joint 80 and the folded configuration of the frame assembly 20. This spacing can further eliminate any pinch or shear point between the frame elements themselves.

The fold latch and fold joint construction disclosed herein significantly minimizes or eliminates the likelihood of pinch, shear, and entrapment within, or around the folding mechanism or fold joint during stroller folding and unfolding. The latch and fold joint construction disclosed herein also permits creating a relatively small latch that is still capable of supporting relatively large loads. The fold latch and fold joint construction disclosed herein can also completely control the position of the latch shuttle during folding and unfolding of the frame assembly, which helps to prevent or eliminate the potential for pinch, shear, and entrapment.

In this example, the basket frame 30 and armrests can also carry a child's tray (not shown) traversing between the frame sides and positioned forward of the child seat assembly 28, and forward of the front leg 36 and push arm 32. The tray can be coupled to the basket frame side supports, which are pivotally connected to both the front leg and rear leg below the fold joint. The tray could then also fold up as the frame assembly 20 is folded.

As mentioned, the front leg and push bar are spaced apart from one another at the fold joint in the folded configuration. Each extends from an opposite side edge of the hub. Thus, the disclosed fold joint and frame element or component arrangement significantly inhibits or eliminates pinch or shear points at the fold joint. Also, the configuration of the fold joint and fold latch components further eliminates or inhibits pinch or shear points.

When the frame assembly is unfolded from the folded configuration, the push arm is raised and rotated away from the front leg. The shuttle pin will travel along the curved track toward the end having the linear slot. However, the pin cannot move radially relative to the pivot axis A until the pin reaches the common end of the curved fold portion of the track shared with the latch portion. By this time, the latch shuttle is aligned again with the upper end of the front leg and, thus the latch receptacle in the first latch part. This aspect of the fold joint and fold latch can also help to eliminate or inhibit shear and pinch points around the fold latch disclosed herein.

Although certain strollers, frame assemblies, fold latches, fold joints, and components thereof have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A fold joint for a stroller comprising:
a first latch part defining a first axis between opposing ends thereof, with one end fixed to a first frame element and the other end comprising:
two plates extending parallel to the first axis and to each other, the plates including:
pivot holes formed through a center portion of each plate, the pivot holes defining a pivot axis therethrough; and
a track formed through at least one of the two plates, the track comprising:
a linear latch portion radially spaced from the pivot axis and extending parallel to the first axis, and
an arcuate fold portion extending from an end of the latch portion distal to the first frame element and defining a constant radius about the pivot axis; and
a second latch part defining a second axis between opposing ends thereof, with one end fixed to a second frame element and the other end comprising:
a substantially circular puck, wherein a lateral width of the puck is selected so as to fit between the parallel plates of the first latch part, the puck comprising:
an opening formed through the width of the puck at a center thereof and extending perpendicular to the second axis, the opening configured to align with the pivot holes in the plates of the first latch part, such that a pivot pin can pass through the aligned holes and opening to allow relative pivoting between the first and second latch parts about the pivot axis;
a latch bore formed through the width of the puck parallel to the second axis at a location radially offset from the opening, substantially aligned with the latch portion of the track, the latch bore further including a linear slot formed through the width of the puck extending perpendicular to the second axis; and
a latch shuttle inserted into the latch bore, the latch shuttle including a latch pin extending perpendicularly therefrom and passing outwardly through the slot and the track;
wherein the latch shuttle is movable between:
a latched position, wherein the latch pin is engaged within the latch portion of the track, and a latching end of the latch shuttle is engaged with a latch receptacle formed in the first frame element, such that the first and second frame elements are locked against pivotal movement about the pivot axis; and
an unlatched position, wherein the latch pin is moved into the fold portion of the track, and the latching end of the latch shuttle is disengaged from the latch receptacle, such that the latch pin is free to move along the fold portion of the track, thereby allowing pivotal movement between the first and second frame elements about the pivot axis.

2. A fold joint according to claim 1, wherein the first frame element is a front leg of a frame assembly of the stroller and wherein the second frame element is a push arm of a handle assembly of the frame assembly.

3. A fold joint according to claim 1, wherein the track formed on the one of the two plates is a first track, and other of the two plates comprises a second track substantially mirroring the track formed on the one plate, and wherein the latch in extends through both tracks.

4. A fold joint according to claim 1, wherein the latch shuttle is resiliently biased toward the latched position.

5. A fold joint according to claim 1, further comprising:
a cover that encloses and hides portions of the first and second latch parts including the latch pin, the track, the slot, and the latch shuttle.

\* \* \* \* \*

UNITED STATES PATENT AND TRADEMARK OFFICE
CERTIFICATE OF CORRECTION

| | | |
|---|---|---|
| PATENT NO. | : 8,961,057 B2 | Page 1 of 1 |
| APPLICATION NO. | : 13/717224 | |
| DATED | : February 24, 2015 | |
| INVENTOR(S) | : Brady Matthew Schroeder | |

It is certified that error appears in the above-identified patent and that said Letters Patent is hereby corrected as shown below:

In the claims:

Column 13
claim 3, line 13, please delete "in" and replace with --pin--.

Signed and Sealed this
Ninth Day of June, 2015

Michelle K. Lee
*Director of the United States Patent and Trademark Office*